Patented Oct. 8, 1929

1,730,626

UNITED STATES PATENT OFFICE

EDMOND RETAILLIAU, OF UNIVERSITY CITY, MISSOURI

COMPOSITION OF MATTER

No Drawing.   Application filed March 3, 1927.   Serial No. 172,566.

My invention relates to improvements in composition of matter, and has for its primary object a composition of matter which is to be used as a shoe paste and which after being applied and becoming thoroughly dried will not rub off. Heretofore most of the shoe pastes or polishes, which were used, for white shoes or light colored shoes, were of such a composition that it readily rubbed off, soiling the garments of the wearer and causing unsightly appearances of the shoes wherever it had been rubbed off.

My composition can be made in various colors so that it can be used for shoes of all colors and it can be used on shoes of all materials.

The components of my composition are as follows, the percentages given being by weight:

| | |
|---|---|
| Phenol | .35 to .50 |
| Soap | 1.8 to 2.0 |
| Zinc oxide | 4.2 to 5.0 |
| Ammonium sulforicinate | 6.0 to 4.0 |
| Lithopone | 13.0 to 15.0 |
| Citronella oil | .1 to .2 |
| Glycerine | 1.8 to 2.5 |
| Calcium carbonate | 27.0 to 25.0 |
| Gelatine | 4.0 to 2.0 |
| Aqua ammonia | .125 to .3 |
| Water | 41.625 to 43.50 |

The above when mixed is in the consistency of a rather stiff paste and white, and when in this condition can be used on white shoes. If it is desired to use the paste for shoes of other colors, pigment is added to the above. The pigment may be added either without any reduction of the above formula or I may reduce the quantity of either the zinc oxide, lithopone or calcium carbonate in proportion to the amount of pigment added, or all three of these ingredients may be proportionately reduced, and the pigment supplied.

My composition can also be reduced to a creamy mass by the addition of more water or liquid or may be even made fluid by the addition of sufficient liquid.

When used in paste form, it is applied either by means of a wet or moist rag or brush and after drying will present a smooth glazed surface, somewhat resembling kid, when used on leather shoes.

As previously mentioned, my paste may be used on shoes of all materials, such as canvas and cloth.

The paste may be put up either in collapsible tubes especially when in the form of a creamy mixture, and, when stiffer than that, in boxes similar to the shoe polish boxes now on the market.

Ammonium sulforicinate is obtained by sulphurating castor oil and neutralizing the product of reaction with ammonia. There are various grades of this product designated by per cent and running between 80 and 90 per cent according to how far the sulphurization has been carried on or how far the process of reaction has been carried on. The ammonium sulforicinate that I use, or prefer to use, is the 88% grade. This product is very necessary in my formula because its effect is of the utmost importance in that when my compound is used on canvas or other fabric shoes the ammonium sulforicinate makes the white pigment penetrate the fabric and not just cover it like a simple pigment in suspension would. Therefore, by letting this penetrate instead of merely covering the fabric, a much more lasting job is obtained and the polish will not rub off after it has dried.

Having fully described my invention, what I claim is:

A composition of matter composed of phenol .35, soap 1.8, zinc oxide 4.2, ammonium sulforicinate 6.0, lithopone 13.0, citronella oil .1, glycerine 1.8, calcium carbonate 27.0, gelatine 4.0, aqua ammonia .125 and water 41.625 all percentages by weight and thoroughly mixed together.

In testimony whereof I have affixed my signature.

EDMOND RETAILLIAU.